United States Patent [19]

Davis

[11] Patent Number: 5,435,495
[45] Date of Patent: Jul. 25, 1995

[54] CENTER PIVOT RUT MOVE

[76] Inventor: Jimmy R. Davis, P.O. Box 465, Hart, Tex. 79043

[21] Appl. No.: 247,352

[22] Filed: May 23, 1994

[51] Int. Cl.⁶ .............................................. B05B 1/20
[52] U.S. Cl. ..................................... 239/728; 239/726
[58] Field of Search ............... 239/728, 730, 732, 726, 239/723, 722, 164, 165, 172, 176

[56] References Cited

U.S. PATENT DOCUMENTS

| | | | |
|---|---|---|---|
| 4,059,911 | 11/1977 | Bean et al. | 37/42 |
| 4,156,504 | 5/1979 | Hegemann | 239/110 |
| 4,180,092 | 12/1979 | Hunter et al. | 37/344 |
| 4,192,388 | 3/1980 | Goebel | 239/726 X |
| 4,209,068 | 6/1980 | Corsentino | 239/726 X |

FOREIGN PATENT DOCUMENTS

| | | | |
|---|---|---|---|
| 685219 | 9/1979 | U.S.S.R. | 239/723 |
| 1053788 | 11/1983 | U.S.S.R. | 239/728 |
| 1386114 | 4/1988 | U.S.S.R. | 239/728 |
| 1435209 | 11/1988 | U.S.S.R. | 239/728 |
| 1551287 | 3/1990 | U.S.S.R. | |

*Primary Examiner*—Andres Kashnikow
*Assistant Examiner*—Lesley D. Morris
*Attorney, Agent, or Firm*—Wendell Coffee

[57] ABSTRACT

The wheel tracks of a center pivot irrigation system are changed by expanding or contracting a telescoping joint located between the center pivot and the first vehicle from the center pivot. The power to expand or contract the telescoping joint is obtained from the first vehicle so that all of the vehicles are in motion at the time the change is made. The telescoping joint has a removable sleeve so that sand may be washed from the telescoping joint.

13 Claims, 3 Drawing Sheets

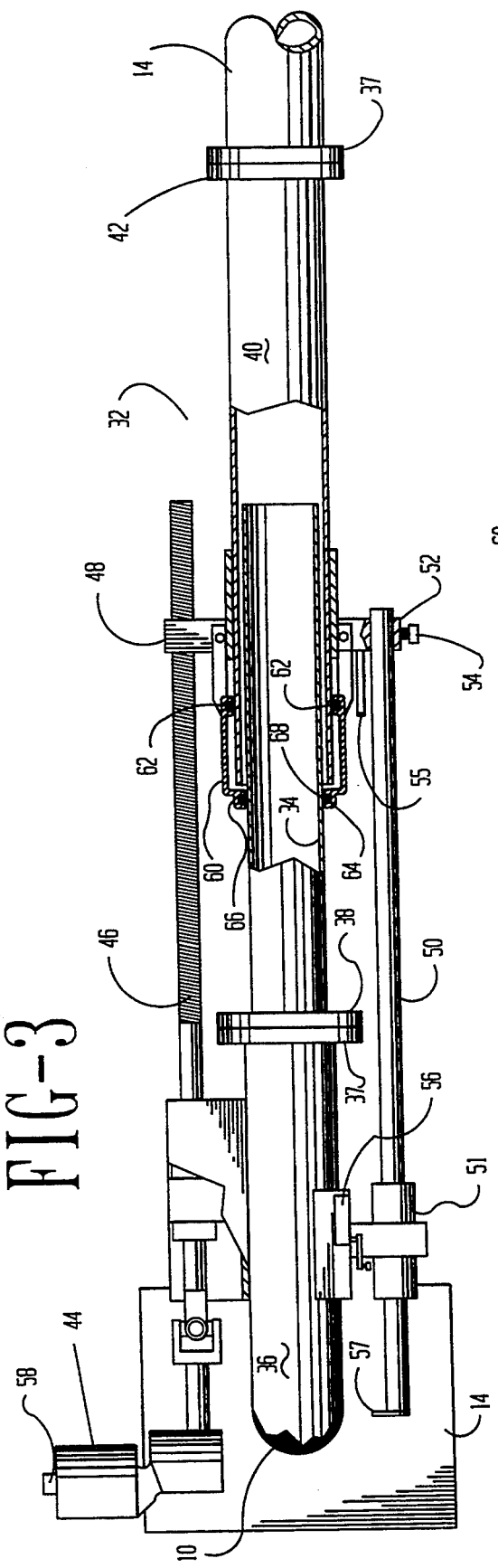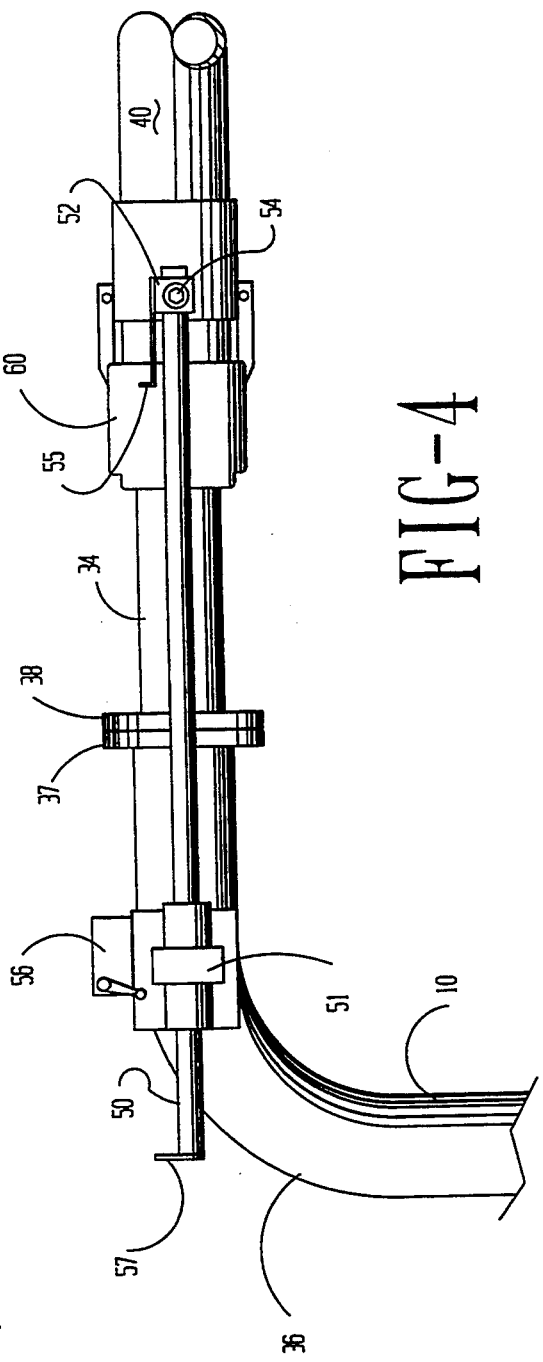

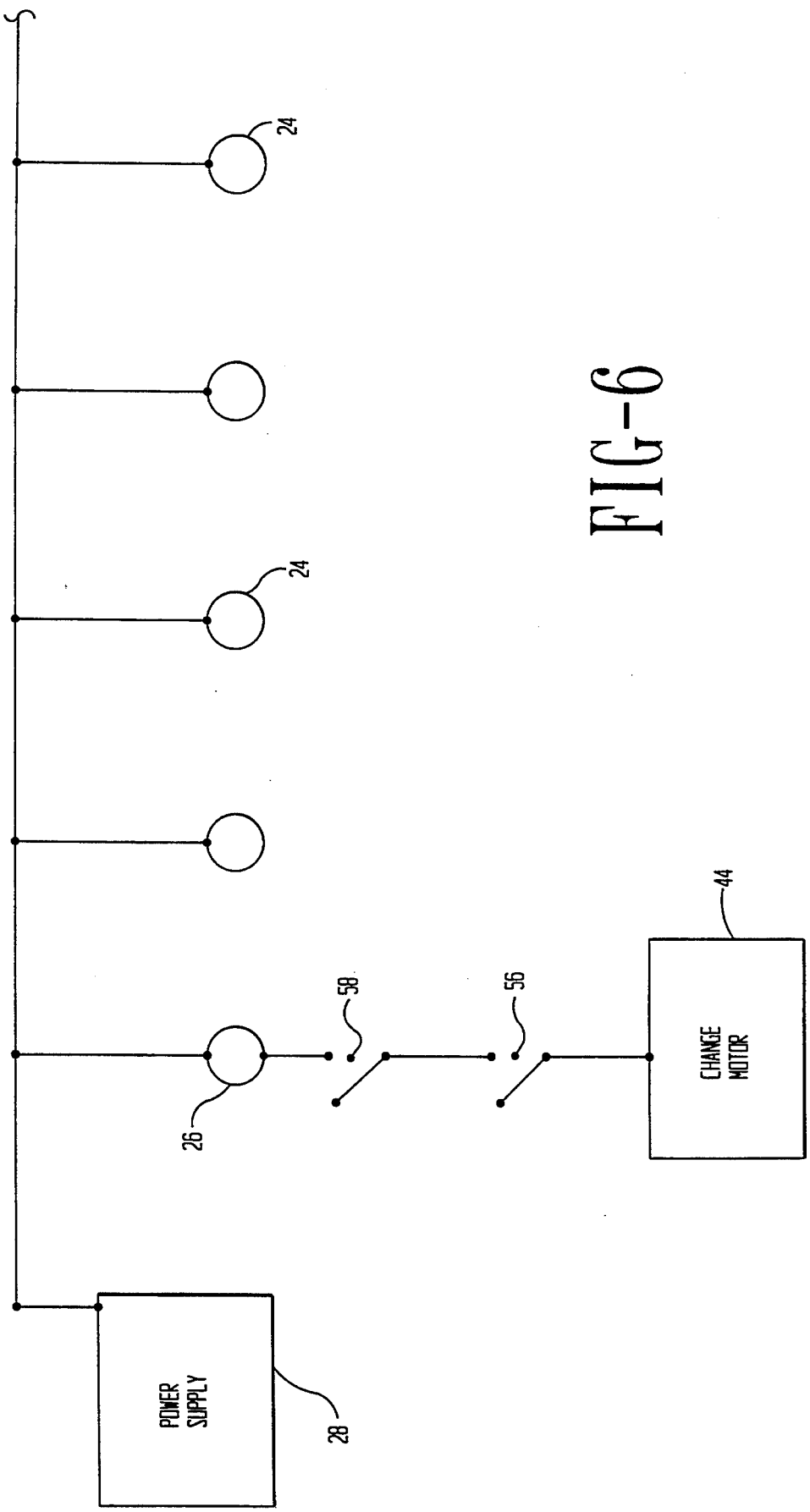

CENTER PIVOT RUT MOVE

BACKGROUND OF THE INVENTION

(1) Field of the Invention

This invention relates to agricultural irrigation and more particularly to center pivot irrigation systems. Farmers operating center pivot irrigation systems have ordinary skill in this art.

(2) Description of the Related Art

Center pivot irrigation systems are widely used in irrigating cultivated farm lands.

A center pivot system has a vertical pipe supplying water to a movable horizontal pipe. One end of the horizontal pipe is attached to the vertical pipe and supported by a plurality of vehicles. The plurality of vehicles move in a circle around the center pivot. Water is sprinkled from the horizontal pipe and the vehicles move continuously. This results in the wheels of the vehicles running continuously over wet cultivated soil.

As a result, ruts are formed from the continuous and repetitive movement of the wheels of the vehicles over the wet ground.

This problem has been recognized in the art. BEAN, U.S. Pat. No. 4,059,911 recognized this problem as early as 1975 and sought to correct it by having plows attached to the vehicles which would plow from the mounds of soil adjacent to the ruts into the ruts. Also Soviet Union Patent 1,551,287 in 1990 recognized the problem and sought to correct it by sheltering the vehicle from the sprinkling water along the vehicle.

Before this invention some people sought to change the track of the vehicles. One way of accomplishing this was to cut the horizontal pipe between the center pivot and the first vehicle. Then change the distance from the center pivot to the first vehicle by moving the entire horizontal pipe and all its supporting vehicles. Normally, the change was two or three feet so that the new track of the vehicle wheels would be separated from the rut previously formed. Then with the distance change the horizontal pipe was reconnected either by removing a section of pipe, or adding a splice or spool into the pipe.

SUMMARY OF THE INVENTION

(1) Progressive Contribution to the Art

This invention solves the problem by providing a quicker and less expensive method and means of changing the distance from the center pivot to the first vehicle. A telescoping expansion joint is placed between the center pivot and the first vehicle.

In a center pivot, all of the vehicles will move at different rates. Although it would be possible to change the rates of the vehicles by changing the speed at which each vehicle is operated. More conventionally the rate change is by changing the period of time each vehicle runs. I.e., the vehicle which is furthest from the center pivot will run continuously and each vehicle along the line will be operated selectively as needed to maintain the horizontal pipe in alignment between the furthest vehicle and the center pivot. The vehicle closest to the center pivot will run slowest or be operated for the least amount of time, and therefore it is designated as the slow vehicle. At any time that the slow vehicle is operating, all of the other vehicles in the system will be operating, which is to say that the motors upon each of the vehicles will be running to turn the wheels of that vehicle.

The preferred method of changing the length of the telescoping joint is to use a rotatable threaded shaft or rod which is attached adjacent to the center pivot. The rod is threaded through a nut which is attached to the other portion of the telescoping joint near the slow vehicle. Then when it is desired to change the distance, a motor connected to the rotatable threaded rod is supplied power from the slow vehicle. Then, the change in the tracks of the vehicles will take place only at the time the slow vehicle and all of the other vehicles are moving. A serious problem of trying to move the wheels of the vehicles along the ground in an axial direction of the wheels is thus avoided.

(2) Objects of this Invention

An object of this invention is to irrigate agricultural land with a center pivot system without forming deep ruts on the land.

Another object of this invention is to prevent the formation of ruts by moving the paths of the wheels of the vehicle, thereby changing the location of the tracks caused by the wheels.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 3 is a top elevational view of a center pivot according to this invention and the telescoping joint attached to it with parts broken away to show details.

FIG. 4 is a side elevational view showing the control side of FIG. 3.

FIG. 6 is a schematic representation of the connection.

As an aid to correlating the terms of the claims to the exemplary drawing(s), the following catalog of elements and steps is provided:

| | |
|---|---|
| 10 | vertical pipe |
| 12 | source of water |
| 14 | pivot support |
| 16 | horizontal pipe |
| 18 | vehicle |
| 20 | slow vehicle |
| 21 | sprinkler |
| 22 | wheels |
| 24 | motor |
| 26 | slow motor |
| 28 | power supply |

| | -continued |
|---|---|
| 29 | mechanical drive |
| 30 | pipe segment |
| 32 | telescoping pipe joint |
| 34 | inside part |
| 36 | elbow |
| 37 | original flanges |
| 38 | flange elbow |
| 40 | outside part |
| 42 | flange |
| 44 | change motor |
| 46 | threaded rod |
| 48 | threaded nut |
| 50 | safety bar |
| 51 | elbow slide |
| 52 | slide |
| 54 | clamp means |
| 55 | short stop |
| 56 | limit switch |
| 57 | long stop |
| 58 | manual |
| 60 | sleeve |
| 62 | large gasket |
| 64 | sleeve distal end |
| 66 | part distal end |
| 68 | small gasket |

DESCRIPTION OF THE PREFERRED EMBODIMENT

Figure 1:
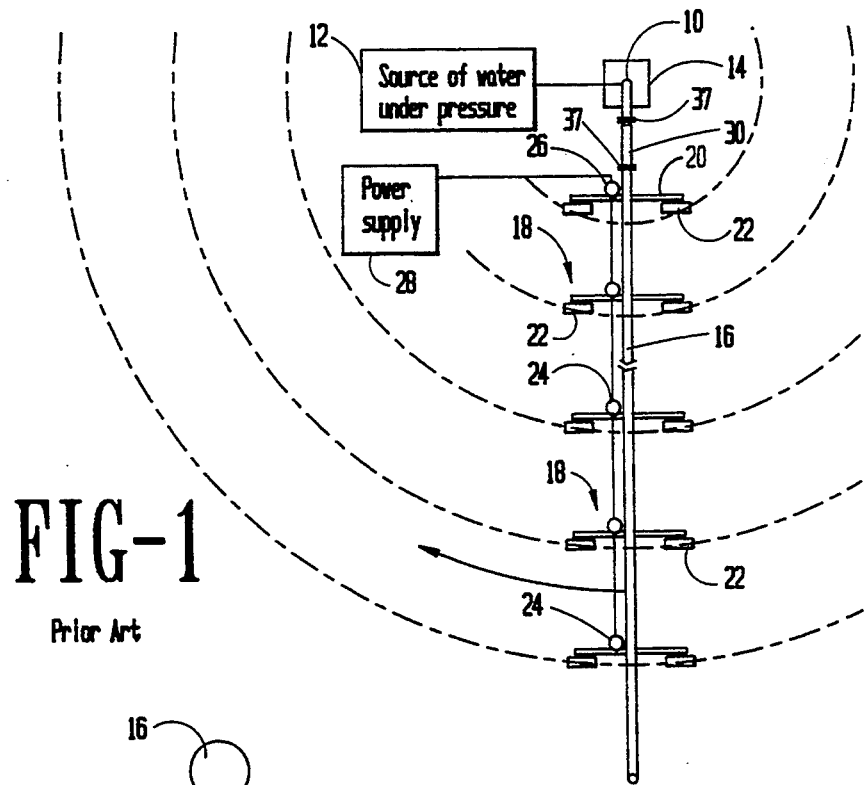
FIG. 1 is a plan view, somewhat schematic in nature, of a prior art center pivot system.
Figure 2:
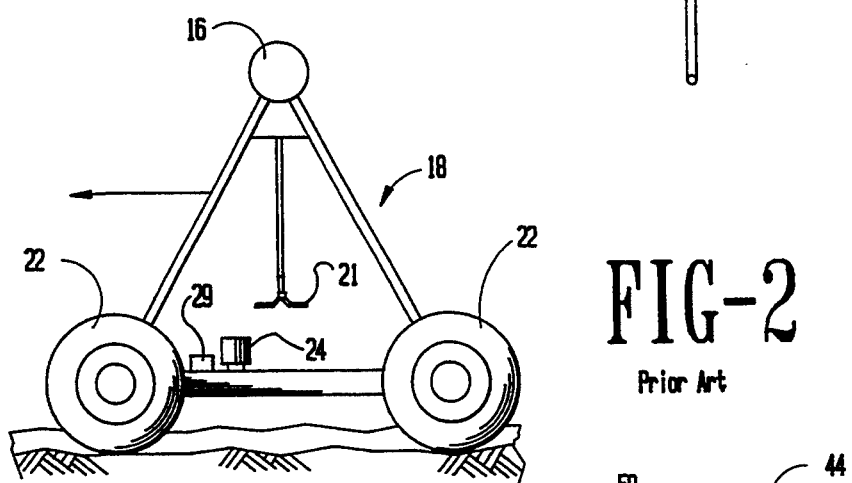
FIG. 2 is a side elevational view of one prior art vehicle taken substantially on line 2—2 of FIG. 1, showing a typical vehicle in a rut.
Figure 5:
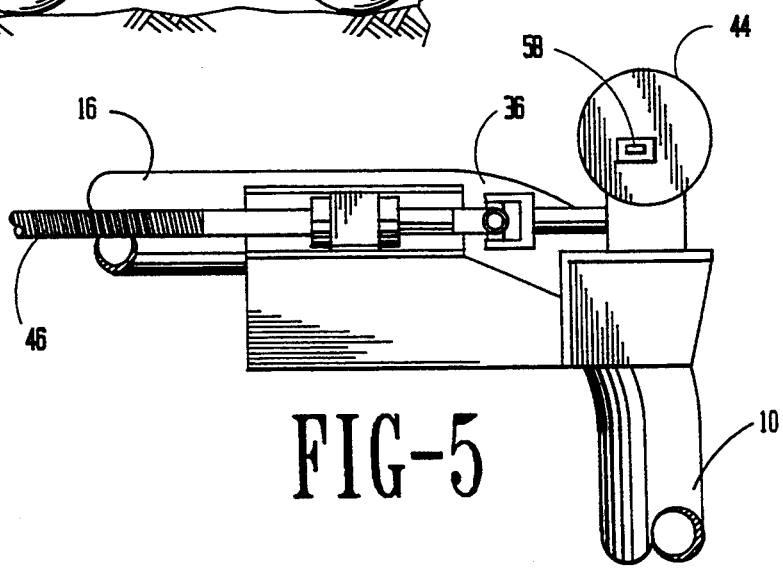
FIG. 5 is a side elevational view taken on the drive side of FIG. 3.

Referring to the drawing there may be seen a center pivot agricultural irrigation system. Stationary vertical pipe 10 is connected to a source of water under pressure 12. The vertical pipe is supported by pivot support 14. Horizontal pipe 16 is connected structurally and fluidly to the vertical pipe 10 by pipe elbow 36 and pipe segment 30 between flanges 37. The horizontal pipe 16 extends radially outward from the vertical pipe 10. The pipe is supported by a plurality of vehicles 18. The vehicle closest to the vertical pipe is designated as slow vehicle 20. The horizontal pipe is adapted to sprinkle water upon the land through a series of sprinklers 21 (shown schematically in FIG. 2). Each of the vehicles 18 has ground-engaging wheels 22 supporting the vehicle and the pipe.

Each vehicle 18 has electric motor 24 connected thereto. The motor on the slow vehicle 20 is designated as slow motor 26. Power supply 28 is connected to each of the motors 24 to supply power thereto. Control means on each of the vehicles (perhaps except for the furthest vehicle) will be controlled by alignment means (not shown). Alignment means, well known in the art, keep the vehicles in alignment by selectively supplying power to the motors. Conventionally the power supply 28 and each of the motors 24 are electrical motors. However, it is known that the motors could be fluid motors supplied either by a special hydraulic fluid or by water. Mechanical drive 29 on each vehicle connecting the motor 24 to at least one of the wheels 22 so that when the motor is energized the wheels are turned and the vehicle moved. The moving vehicles 18 move the horizontal pipe 16 around the center pivot vertical pipe 10 and pivot support 14.

Those with ordinary skill in agricultural irrigation will understand the description to this point is well known and commercially available on the market.

Telescoping pipe joint 32 has two parts. Inside part 34 is attached to elbow 36 on the vertical pipe 10. The elbow 36 is connected by a rotatable joint (not shown) but well known to the art. Flange 38 is a convenient means by which inside part 34 is connected to half of one of the original flanges 37 when the original pipe segment 30 is removed. Outside part 40 is telescoped over the inside part 34. The outside part is attached by flange 42 to the horizontal pipe 14 by half of the other original flange 37. The telescoped pipe joint 32 is located between the center pivot and the slow vehicle 20. Electric change motor 44 is structurally connected to one of said parts, namely to the inside part 34. It is not directly attached thereto but is connected thereto by being attached to the elbow 36 as shown in the drawing.

Threaded rod 46 is journalled to the elbow 36 and therefore is also connected to the inside part 34. Threaded nut 48 is connected and attached directly to the outside part 40. The threaded rod 46 is threaded through the threaded nut 48. Details of the mounting of the rod 46 are shown in the drawings but not described for conciseness. Therefore rotation of the threaded rod by the change motor 44 will change the position of the outside part relative to the inside part. Assuming that the vehicles are moving and the wheels 22 are rotating, this will result in a change in distance between the slow vehicle 20 and the center pivot.

Safety bar 50 slides through elbow slide 51. The slide 51 is attached to the elbow 36 and therefore connected to the inside part 34. Slide 52 is attached to the outside part 40. The safety bar is telescoped within the slide 52. Clamp means 54 is attached to the slide and through operation of the clamp means, the safety bar is locked into position to the slide. By this means the two parts 34 and 40 of the telescoping joint are locked into position. Therefore the clamp must be released before the slow vehicle may be changed in position from the center pivot. Limit switch 56 is attached to the elbow 36. Short stop 55 is attached to the slide 52 in line with the limit switch 56. Therefore as the pipe telescopic joint 32 is being contracted the short stop 55 will contact the limit switch 56 and reverse the change motor 44 starting the telescopic joint 32 to expand again. Likewise long stop 57 is attached to the safety bar 50 at the end thereof. Therefore upon expansion of the joint 32 the long stop 57 will contact the limit switch 56 and again reverse the change motor 44 so that the change motor ceases the expansion of the telescopic joint 32 and begins again the retraction thereof. The limit switch is electrically connected to the change motor 44.

The change motor 44 is connected (by means not shown for clarity of the drawing) to an electrical connection on the slow motor 26 on the slow vehicle 20. Therefore the change motor 44 can operate only when the slow motor 26 is operating which is when the slow motor is moving the slow vehicle. As explained previously, any time the slow motor is operating, the motors on each of the vehicles is operating.

If the center pivot system has hydraulic powered motors 24 then the change motor 44 would be hydraulic. Also, the switches would be valves. Also manual power could rotate rod 46 instead of the motor 44.

Manual switch 58 is also electrically connected to the change motor 44. Therefore for the change motor to operate it is not only necessary that the slow motor be in operation, but also the manual switch 58 must be closed.

Short sleeve 60 is attached to the outside part 40 of the telescoping pipe joint 32. It is attached to the ring which carries the threaded nut 48 and the slide 52. The attachment of the sleeve to the outside part 40 is releasable. Large gasket 62 is positioned between the sleeve 60 and the outside surface of the outside part 40. As clearly seen in the drawings, FIG. 3, the sleeve distal end 64 extends beyond the outside part distal end 66. Small gasket 68 is located between a gasket groove adjacent to the sleeve distal end 64 and the inside part 34.

It will be understood that in the normal operation the gaskets 62 and 68 prevent the loss of water from the telescoping joint 32. I.e., water is free to flow between the telescoping joints but at the distal end of the large part the water will be trapped within the sleeve 60. It cannot escape along the inside part 34 because of the small gasket 68 and it cannot escape from between the sleeve and the outside part 40 because of the large gasket 62. The clearance between the inside part 34 and outside port 40 is exaggerated in the drawing to illustrate the washing.

As previously stated, the sleeve 60 is detachably connected to the large part 40, therefore the sleeve may be released and moved away from the large part. In this position water will freely flow between the two parts of the telescoping joint. By moving the sleeve and permitting the water to flow, sand which may accumulate between the moving parts of the telescoping joint may be released.

It may be seen that when the operator wishes to change the tracks of the wheels of the vehicles, this may be done by closing the manual switch 58. Upon closing the switch 58 the distance from the center pivot to the slow vehicle would be changed each time the slow vehicle moved. The operator leaves the manual switch closed until the desired movement has been achieved and then would open the manual switch 58.

If the ruts within the cultivated land are so deep that it is difficult to cause the vehicles 18 to climb out of the ruts upon changing the distance of the slow vehicle 20 from the center pivot 10, it is desirable to place the horizontal pipe and all the vehicles on hard ground. In normal arrangement of a center pivot system there will be a road from the edge of the field to be watered to the center pivot location. The road is for general maintenance and operation. The vehicles 18 may be moved by manual operation of the system so that they are upon the hard ground of the road. By closing the manual switch 58 and manually operating the vehicle drive switch (not shown) so that the system moves back and forth across the hard road. The change of the position of the wheel tracks of the vehicle can be solely accomplished without the vehicles being within the ruts which have been created in the cultivated field but restricted to the tracks upon the road which, in normal operation, will not be badly rutted.

It may be seen that structure and operating procedures are provided to prevent the formation of ruts by moving the paths of the wheels of the vehicles.

The electrical connections between the power supply and the motors and switches have not been shown since those with ordinary skill in the art will understand their connection.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A process of operating a center pivot irrigation system having;
   a) a stationary vertical pipe forming a center pivot connected to
   b) a source of water under pressure located on
   c) agricultural land,
   d) a horizontal pipe adapted to sprinkle water on the land supported by
   e) a plurality of vehicles each having ground engaging wheels,
   f) the horizontal pipe connected by a fluid connection to the vertical pipe,
   g) a power supply,
   h) a motor on each vehicle connected to the power supply,
   i) a mechanical drive on each vehicle connecting the motor to at least one of the wheels,
   j) whereby each of the vehicles is moved thus moving the horizontal pipe around the center pivot,: and
   k) the vehicle nearest the center pivot designated as the slow vehicle;
   comprising the following steps:
   l) supplying power from said power supply to each of said motors at selected intervals to move the horizontal pipe, and
   m) selectively changing the distance from the center pivot to the slow vehicle during the time the motor on the slow vehicle is supplied with power, and while the horizontal pipe is fluidly connected to the vertical pipe.

2. The process as defined in claim 1 further comprising
   n) said step of changing the distance occuring while the vehicles are on hard ground.

3. The process as defined in claim 1 wherein the step of changing the distance from the center pivot to the slow vehicle is accomplished by
   n) expanding and contracting a telescopic joint between the center pivot and the slow vehicle.

4. The process as defined in claim 3 further comprising:
   o) preventing a loss of water in the telescopic joint by
   p) contacting parts of the telescopic joints with gaskets.

5. In a self-propelled center pivot irrigation system having
   a) a stationary vertical pipe forming a center pivot connected to
   b) a source of water under pressure located on
   c) agricultural land,
   d) a horizontal pipe adapted to sprinkle water on the land supported by
   e) a plurality of vehicles each having ground engaging wheels,
   f) the horizontal pipe connected by a fluid connection to the vertical pipe,
   g) a power supply,
   h) a motor on each vehicle connected to the power supply,
   i) a mechanical drive on each vehicle connecting the motor to at least one of the wheels, whereby each of the vehicles is moved thus moving the horizontal pipe around the center pivot, and
   j) the vehicle nearest the center pivot designated as the slow vehicle;

k) the improved structure in combination with the above comprising:
  l) a telescoping pipe joint having two parts between the center pivot and slow vehicle forming a part of said fluid connection between the horizontal pipe and vertical pipe.

6. The structure as defined in claim 5 further comprising:
  m) two gaskets attached to a sleeve, and
  n) one of the gaskets between the sleeve and one of the parts of the telescoping pipe joint, and the other gasket between the sleeve and the other part of the joint, and
  o) means for removing the sleeve on the telescoping joint with the gaskets thereon whereby sand may be flushed from the joint.

7. The structure as defined in claim 5 with the additional limitation comprising:
  m) change means for expanding and contracting the telescoping pipe joint connected thereto.

8. The structure as defined in claim 7 further comprising:
  n) a power connection for supplying power to the change means extending from the change means to the power source at the motor on the slow vehicle.

9. The structure as defined in claim 7 wherein said change means includes
  n) a threaded rod connected to one of said parts of the telescoping pipe joint,
  o) a threaded nut connected to another of said parts of the telescoping pipe joint, and
  p) said threaded rod is threaded through the threaded nut.

10. The structure as defined in claim 9 with the additional limitation comprising:
  q) a safety bar attached to one of said parts of said telescoping joint,
  r) a slide attached to another of said parts of said telescoping joint,
  s) said safety bar telescoping within the slide,
  t) means on the slide for clamping the safety bar to the slide, and
  u) a limit switch structurally adjustably attached to the safety bar and electrically connected to the change means.

11. The structure as defined in claim 7 further comprising:
  n) said motor on each of the vehicles is an electrical motor, and
  o) said change means includes a change means electric motor.

12. The structure as defined in claim 11 wherein the power for said change means electric motor is supplied by p) an electrical connection to the electric motor on the slow vehicle.

13. In a self-propelled center pivot irrigation system having
  a) a stationary vertical pipe forming a center pivot connected to
  b) a source of water under pressure located on
  c) agricultural land,
  d) a horizontal pipe adapted to sprinkle water on the land supported by
  e) a plurality of vehicles each having ground engaging wheels,
  f) the horizontal pipe connected by a fluid connection to the vertical pipe,
  g) a power supply,
  h) a motor on each vehicle connected to the power supply,
  i) a mechanical drive on each vehicle connecting the motor to at least one of the wheels, whereby each of the vehicles is moved thus moving the horizontal pipe around the center pivot, and
  j) the vehicle nearest the center pivot designated as the slow vehicle;
  k) the improved structure in combination with the above comprising:
    l) a telescoping pipe joint having two parts between the center pivot and slow vehicle forming a part of said fluid connection between the horizontal pipe and vertical pipe,
    m) an electric change motor structurally connected to one of said parts of the telescoping pipe joint,
    n) a threaded rod connected to one of said parts of the telescoping pipe joint,
    o) a threaded nut connected to another of said parts of the telescoping pipe joint,
    p) said threaded rod is threaded through the threaded nut, a safety bar attached to one of said parts of said telescoping joint,
    r) a slide attached to another of said parts of said telescoping joint,
    s) said safety bar telescoping within the slide,
    t) means on the slide for clamping the safety bar to the slide,
    u) a limit switch structurally adjustably attached to the safety bar and electrically connected to the electric change motor,
    v) an electric connection from the motor on the slow vehicle to the change motor,
    w) two gaskets attached to a sleeve,
    x) one of the gaskets between the sleeve and one of the parts of the telescoping pipe joint and the other gasket between the sleeve and the other part of the joint, and,
    y) means for removing the sleeve on the telescoping joint with the gaskets thereon whereby sand may be flushed from the joint.

* * * * *